United States Patent
Zhu (10) Patent No.: US 11,700,417 B2
(45) Date of Patent: Jul. 11, 2023

(54) METHOD AND APPARATUS FOR PROCESSING VIDEO

(71) Applicant: Beijing Baidu Netcom Science and Technology Co., Ltd., Beijing (CN)

(72) Inventor: Zhaomin Zhu, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 101 days.

(21) Appl. No.: 17/204,237

(22) Filed: Mar. 17, 2021

(65) Prior Publication Data

US 2021/0203859 A1    Jul. 1, 2021

(30) Foreign Application Priority Data

May 27, 2020   (CN) .......................... 202010460106.5

(51) Int. Cl.
*H04N 21/431* (2011.01)
*H04N 21/2187* (2011.01)

(52) U.S. Cl.
CPC ..... *H04N 21/4316* (2013.01); *H04N 21/2187* (2013.01)

(58) Field of Classification Search
CPC ....................... H04N 21/4316; H04N 21/2187
See application file for complete search history.

(56) References Cited

U.S. PATENT DOCUMENTS

| | | | |
|---|---|---|---|
| 10,270,934 B2 | 4/2019 | Pantin et al. | |
| 10,880,495 B2 | 12/2020 | Yao | |
| 2001/0015729 A1 | 8/2001 | Eguchi | |
| 2002/0194590 A1* | 12/2002 | Pong | H04N 7/17318 348/E7.071 |
| 2009/0284645 A1 | 11/2009 | Nozaki et al. | |
| 2011/0063415 A1* | 3/2011 | Gefen | H04N 21/8133 348/42 |
| 2011/0202603 A1* | 8/2011 | Mate | H04N 21/4316 709/205 |
| 2016/0065864 A1 | 3/2016 | Guissin | |
| 2018/0061057 A1* | 3/2018 | Farre Guiu | G06V 20/41 |
| 2018/0122114 A1 | 5/2018 | Luan et al. | |
| 2020/0077035 A1 | 3/2020 | Yao | |
| 2020/0252581 A1* | 8/2020 | Zhong | H04N 7/0132 |

FOREIGN PATENT DOCUMENTS

| | | |
|---|---|---|
| CN | 102867418 A | 1/2013 |
| CN | 108132762 A | 6/2018 |
| CN | 108965982 A | 12/2018 |
| CN | 110536151 A | 12/2019 |
| JP | 2008061157 A | 3/2008 |
| WO | 2017056229 A1 | 4/2017 |

* cited by examiner

*Primary Examiner* — Michael R Telan
(74) *Attorney, Agent, or Firm* — The Webb Law Firm (57) ABSTRACT

A method and an apparatus for processing a video are provided technology. The method may include: separating a foreground image and a background image from a video frame in the target video stream, in response to acquiring a target video stream; adding a to-be-displayed content at a target display position in the background image to obtain a processed background image; and combining the foreground image and the processed background image to obtain a target video frame. The present disclosure may directly render the to-be-displayed content in the background, so that the content displayed in the background does not block a body in the foreground, such as person.

20 Claims, 6 Drawing Sheets

METHOD AND APPARATUS FOR PROCESSING VIDEO

CROSS-REFERENCE TO RELATED APPLICATION

This application claims priority to Chinese Patent Application No. 202010460106.5 filed May 27, 2020, the disclosure of which is hereby incorporated by reference in its entirety.

BACKGROUND OF THE INVENTION

Field of the Invention

Embodiments of the present disclosure relate to the field of computer technology, in particular to the field of computer vision technology, and more particular to a method and apparatus for processing a video.

Description of Related Art

With the development of the network and video industry, the content display methods carried is carries have also been continuously enriched and developed. In recent years, video display forms such as live streams and short videos have become more and more common in people's lives, and the social influence they bring has also attracted more and more attention. Common live streams include shopping live streams, talent live streams, and so on.

A variety of content, such as text, pictures, videos, or dynamic images, can be displayed in the areas of the above-mentioned various forms of video pictures. Displaying the above content in the video can play a role in publicity and promotion, which can enrich the display function of the video.

SUMMARY OF THE INVENTION

A method, apparatus, electronic device and storage medium for processing a video are provided.

According to a first aspect, a video processing method is provided, which includes: separating a foreground image and a background image from a video frame in the target video stream, in response to acquiring a target video stream; adding a to-be-displayed content at a target display position in the background image to obtain a processed background image; and combining the foreground image and the processed background image to obtain a target video frame.

According to a second aspect, there is provided a video processing device, including: a separation unit, configured to separate a foreground image and a background image from a video frame in the target video stream, in response to acquiring a target video stream; an adding unit, configured to add a to-be-displayed content at a target display position in the background image to obtain a processed background image; and a combination unit, configured to combine the foreground image and the processed background image to obtain a target video frame.

According to a third aspect, there is provided an electronic device, including: one or more processors; a storage device, for storing one or more programs, where the one or more programs, when executed by one or more processors, cause the one or more processors to implement the method for processing a video according to any method embodiment.

According to a fourth aspect, there is provided a computer-readable storage medium having a computer program stored thereon, which, when executed by a processor, implements the method for processing a video according to any method embodiment.

BRIEF DESCRIPTION OF THE DRAWINGS

By reading the detailed description of non-limiting embodiments with reference to the following accompanying drawings, other features, objectives and advantages of the present disclosure will become more apparent.

DESCRIPTION OF THE INVENTION

The following describes example embodiments of the present disclosure with reference to the accompanying drawings, which include various details of the embodiments of the present disclosure to facilitate understanding, and should be regarded as merely example. Therefore, those of ordinary skill in the art should realize that various changes and modifications may be made to the embodiments described herein without departing from the scope and spirit of the present disclosure. Likewise, for clarity and conciseness, descriptions of well-known functions and structures are omitted in the following description.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
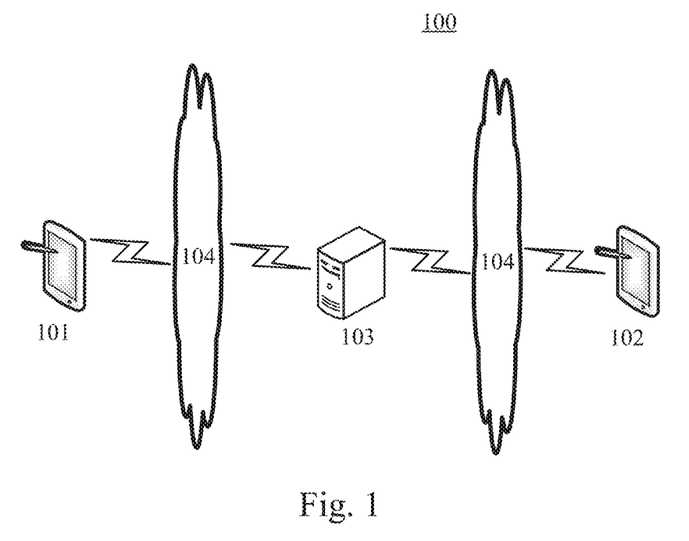
FIG. 1 is an example system architecture diagram to which some embodiments of the present disclosure may be implemented.

FIG. 1 illustrates an example system architecture 100 of an embodiment of a method for processing a video or an apparatus for processing a video in which the present disclosure may be implemented.

As shown in FIG. 1, the system architecture 100 may include terminal devices 101, 102, a network 104, and a server 103. The network 104 is used to provide a communication link medium between the terminal devices 101, 102 and the server 103. The network 104 may include various types of connections, such as wired, wireless communication links, or optic fibers.

A user may interact with the server 103 through the network 104 using the terminal devices 101, 102 to receive or send messages and the like. Various communication client applications may be installed on the terminal devices 101, 102, such as video applications, live stream applications, instant messaging tools, email clients, or social platform software.

The terminal devices 101, 102 may be hardware or software. When the terminal devices 101, 102 are hardware, they may be various electronic devices having display screens, including but not limited to smart phones, tablet computers, E-book readers, laptop portable computers, desktop computers, or the like. When the terminal devices 101, 102 are software, they may be installed in the electronic devices listed above. They may be implemented as a plurality of software pieces or software modules (for example, a plurality of software or software modules for providing distributed services), or as a single software piece or software module, which is not specifically limited herein. In practice, either one of the terminal devices 101 and 102 may be a terminal device for outputting a live stream of a live video stream, and the other is a terminal device for a viewer watching the live stream.

The server 103 may be a server that provides various services, for example, a live stream platform server that provides support for the terminal devices 101, 102. For example, the backend server may process such as analyze a target video stream and other data acquired from the terminal device 101, and send a processing result (for example, a target video frame) to the terminal device 102.

It should be noted that the method for processing a video provided by the embodiments of the present disclosure may be performed by the server 103 or the terminal devices 101, 102, and accordingly, the apparatus for processing a video may be provided in the server 103 or the terminal devices 101, 102.

It should be understood that the number of terminal devices, networks, and servers in FIG. 1 is merely illustrative. Depending on the implementation needs, there may be any number of terminal devices, networks, and servers.

Figure 2:
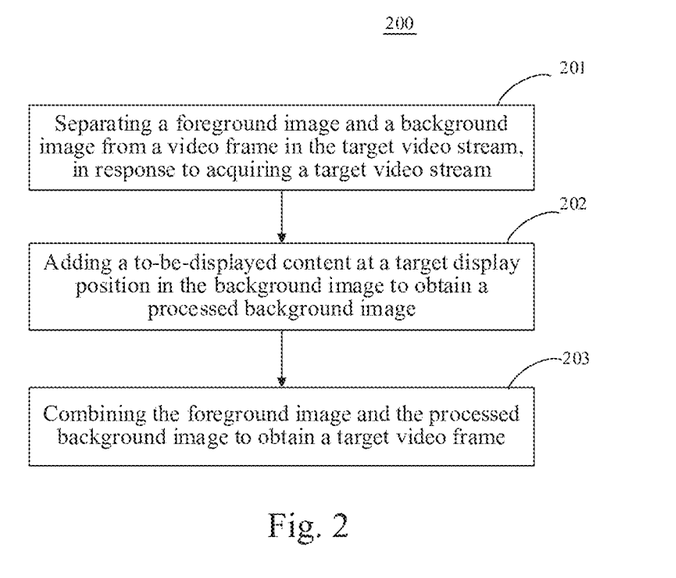
FIG. 2 is a flowchart of an embodiment of a method for processing a video according to the present disclosure.

With further reference to FIG. 2, a flow 200 of an embodiment of a method for processing a video according to the present disclosure is illustrated. The method for processing a video includes the following steps 201 to 203.

Step 201 includes separating a foreground image and a background image from a video frame in a target video stream, in response to acquiring the target video stream.

In the present embodiment, an executing body on which the method for processing a video is run (for example, the server or terminal devices shown in FIG. 1) may separate a foreground and a background from the video frame in the acquired target video stream, in response to acquiring the target video stream from the present electronic device or other electronic devices, thereby separating the foreground image and the background image. The acquired target video stream may be sent to the present electronic device by a terminal device of a user (such as anchor). A size of the foreground image and a size of the background image separated from a target video frame are both equal to a size of the video frame. The target video stream in the present embodiment may be a live video stream or a recorded video stream.

Step 202 includes adding a to-be-displayed content at a target display position in the background image to obtain a processed background image.

In the present embodiment, the executing body may add the to-be-displayed content at the target display position in the separated background image, and use an adding result as the processed background image. The executing body may use various methods for performing the adding processing. For example, the to-be-displayed content may cover the target display position, replace the target display position, or be placed on an upper layer of the target display position in the background image.

The executing body may acquire the target display position. The to-be-displayed content may be various content, such as image, text, or video. Specifically, the to-be-displayed content may be a slogan for promotion, an advertisement for promotion, and so on. The target display position may be expressed as a coordinate position in the image, such as the coordinates of an edge (contour) of the area where the target display position is located, and/or the coordinate of a center point. In addition, the target display position may also include information such as a width or height of the area where the target display position is located.

In practice, the executing body may acquire the target display position in various methods. For example, the executing body may directly acquire the target display position from the present electronic device or other electronic devices. The target display position may be preset or generated by the other electronic devices. In addition, the executing body may also generate the target display position in the present electronic device in real time. Specifically, the target display position may be randomly generated or generated according to a preset rule, such as using the edge and a certain vertex (top left vertex or top right vertex) of the image as a part of an edge and a vertex of the to-be-displayed content, to generate a target display position that fits a size of the to-be-displayed content.

Step 203 includes combining the foreground image and the processed background image to obtain a target video frame.

In the present embodiment, the executing body may combine the foreground image obtained by separation and the processed background image, and use a combination result as the target video frame. In practice, the executing body may perform steps 201, 202, and 203 for each video frame in the acquired target video stream to ensure the stability of the to-be-displayed content in a video picture.

The method provided by the above embodiment of the present disclosure may use a method for directly rendering the to-be-displayed content in the background, so that the content displayed in the background does not block a subject in the foreground, such as person. At the same time, the above embodiment avoids a single display way that can only display content at an edge of a video picture, and improves the flexibility of content display in the video.

Figure 3:
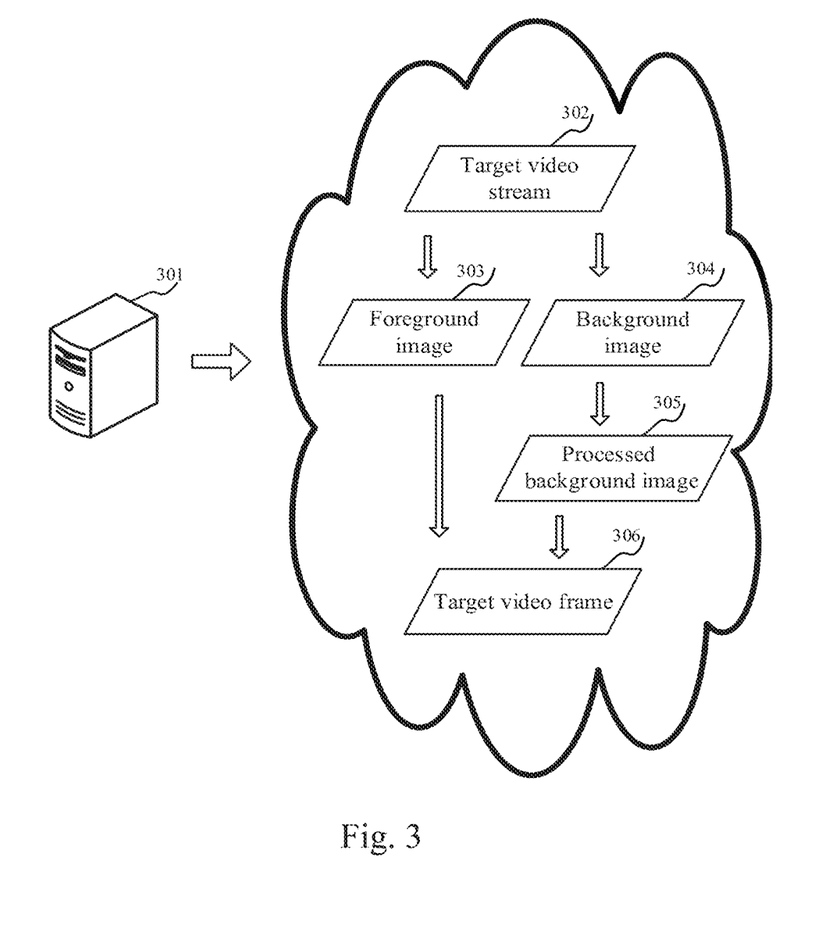
FIG. 3 is a schematic diagram of an application scenario of the method for processing a video according to the present disclosure.

With further reference to FIG. 3, FIG. 3 is a schematic diagram of an application scenario of the method for processing a video according to the present embodiment. In the application scenario of FIG. 3, in response to acquiring a target video stream 302, an executing body 301 separates a foreground image 303 and a background image 304 from a video frame in the target video stream 302. At a target display position in the background image 304, a to-be-displayed content is added to obtain a processed background image 305. The target display position is a rectangular area (x, y, h, w), where x, y are the center point of the target display position, and h, w are the height and width of the target display position. The foreground image 303 and the processed background image 305 are combined to obtain a target video frame 306.

Figure 4A:
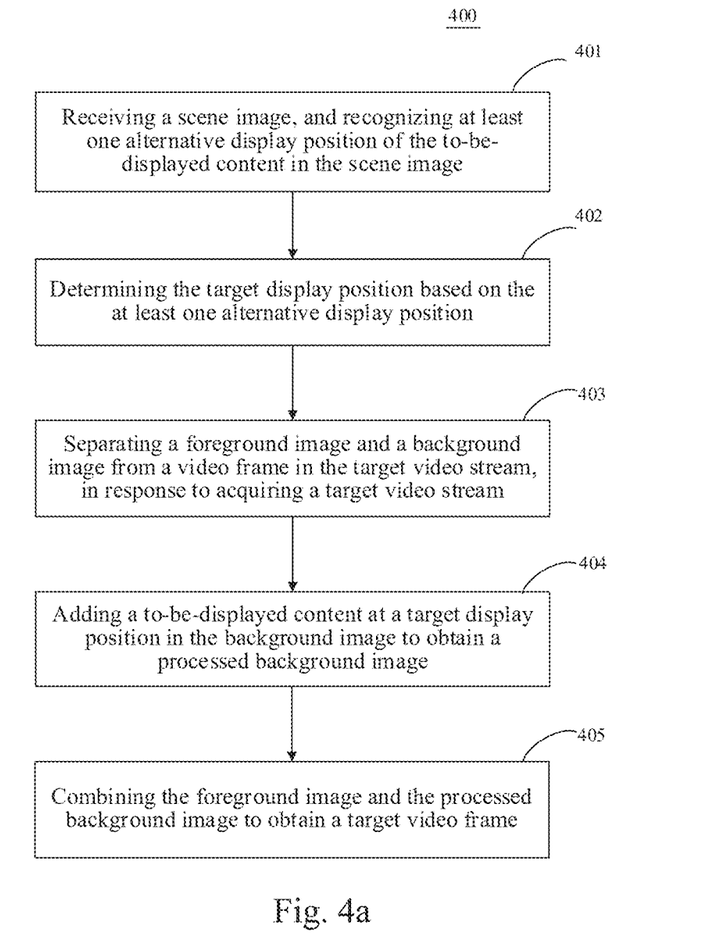
FIG. 4a is a flowchart of another embodiment of the method for processing a video according to the present disclosure.

With further reference to FIG. 4a, illustrating a flow 400 of another embodiment of the method for processing a video, where the target video stream is a live video stream. The flow 400 includes the following steps 401 to 405.

Step 401 includes receiving a scene image, and recognizing at least one alternative display position of the to-be-displayed content in the scene image, where the scene image is a single image or a video stream, and a scene in the scene image is the same as a scene in the target video stream.

In the present embodiment, if an executing body on which the method for processing a video is run (for example, the server or terminal devices shown in FIG. 1) receives the scene image, the executing body may recognize one or more alternative display positions of the to-be-displayed content in the scene image. The to-be-displayed content is a content to be displayed in the picture of the live video stream. The scene image is an image that can reflect a real scene in a scene being shot. The scene image may be a live stream scene such as a live stream room. The scene image may not show a person such as the anchor.

In practice, the executing body may recognize the at least one alternative display position in various methods. For example, the executing body may recognize a large-area color block (that is, a color block having an area exceeding a preset area threshold), such as recognizing a wall, the ground, and use a position of the recognized large-area color block as the at least one alternative display position.

The scene image may be a plurality of images, that is, video frames in the video stream. In addition, the scene image may alternatively be a single image. In the case that the scene image is a video stream, the executing body may select a video frame in the video stream for recognition, to obtain the at least one alternative display position. Alternatively, the executing body may recognize a plurality of video frames in the video stream, and determine in the recognition results an average value of positions for recognition results of a given object, and use the average values of the positions determined for the objects as the at least one alternative display position. In addition, the executing body may alternatively recognize a plurality of video frames in the video stream, and use all recognition results as the at least one alternative display position.

Alternatively, the scene image may not be oriented toward a user of a target terminal device. The user of the target terminal device here refers to a live stream audience, that is, the scene image is not sent to the target terminal device of the live stream audience, so that the live stream audience may not see the scene image. Correspondingly, the target video stream may be a video stream being oriented toward the user of the target terminal device.

Both the scene image and the target video stream are shot and obtained for a given live stream room, that is, shot and obtained for the given scene. Specifically, the executing body or other electronic devices may determine whether the scene image and the target video stream are obtained for the given scene by determining whether there are at least some same objects (for example, objects near the edge, generally do not include live stream subject such as person) for the scene image and the target video stream. If there are at least some same objects between the scene image and the target video stream, it is determined that the scene image and the target video stream are for the same scene. In addition, if a device identification of the electronic device that generates and sends the scene image and the target video stream is the same identification, the executing body may also consider that the scene image and the target video stream are for the same scene.

Step 402 includes determining the target display position based on the at least one alternative display position.

In the present embodiment, the executing body may determine the target display position based on the at least one alternative display position. The target display position is a display position in the scene image. In practice, the executing body may determine the target display position based on the at least one alternative display position in various methods. For example, the executing body may directly determine a recognized alternative display position as the target display position. In addition, the executing body may alternatively use a first recognized alternative display position in the at least one alternative display position as the target display position.

Step 403 includes separating a foreground image and a background image from a video frame in the target video stream, in response to acquiring a target video stream.

In the present embodiment, the executing body may separate a foreground and a background from the video frame in the acquired target video stream, in response to acquiring the target video stream from the present electronic device or other electronic devices, thereby separating the foreground image and the background image. The acquired target video stream may be sent to the present electronic device from a user device. A size of the foreground image and a size of the background image separated from the video frame are both equal to a size of the video frame.

Step 404 includes adding a to-be-displayed content at a target display position in the background image to obtain a processed background image.

In the present embodiment, the executing body may add the to-be-displayed content at the target display position in the separated background image, and use an adding result as the processed background image. The executing body may use various methods for processing. For example, the to-be-displayed content may cover the target display position, replace the target display position or be placed on an upper layer of the target display position in the background image.

Step 405 includes combining the foreground image and the processed background image to obtain a target video frame.

In the present embodiment, the executing body may combine the foreground image obtained by separation and the processed background image, and use a combination result as the target video frame.

Figure 4B:
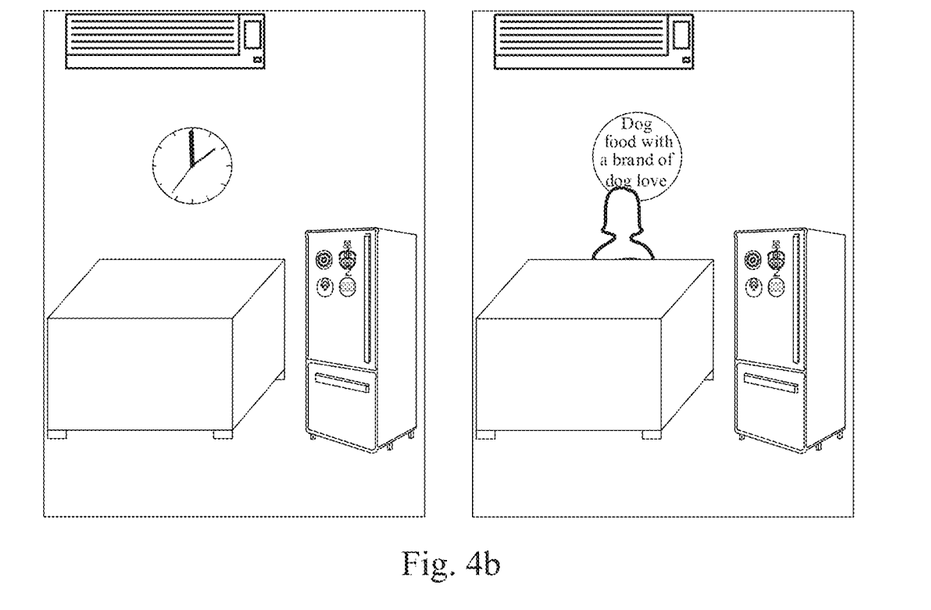
FIG. 4b are schematic diagrams of a scene image and a target video frame according to the method for processing a video of the present disclosure.

As shown in FIG. 4*b*, the image on the left is a scene image with a wall clock. The image on the right shows a target video frame generated after receiving a live video stream. A target display position in the target video frame is the position of the wall clock in the scene image.

In the present embodiment, a real scene image of a live stream room may be acquired before a live stream starts, so that the target display position can be determined based on an actual situation of the live stream room, which improves a matching degree between the target display position and the real scene of the live stream room.

In some alternative implementations of the present embodiment, step 402 may include: acquiring adjustment information for the at least one alternative display position, where the adjustment information includes position selection information and/or position movement information; and adjusting the at least one alternative display position based on the adjustment information, and using an adjustment result as the target display position.

In these alternative implementations, the executing body may acquire the adjustment information for the alternative display position. The adjustment information here may be set by a user of a live stream platform (such as operation and maintenance staff of the live stream platform). Furthermore, the executing body may select a display position indicated by the adjustment information based on the adjustment information, and/or move a position of the alternative display position to obtain a moved display position, so as to realize adjustment of the at least one alternative display position. In addition, if the number of alternative display positions included in the adjustment result exceeds the number of to-be-displayed content, the executing body may further adjust the adjustment result, such as selecting a display position that meets the number of the to-be-displayed content according to a preset rule or randomly, so as to end the adjustment and use the final adjustment result as the target display position.

The adjustment information may indicate one or more alternative display positions selected from the at least one alternative display position, and may also indicate position movement information for more than one alternative display position in the at least one alternative display position. The position movement information may include the one or more alternative display positions and destination positions to which the more than one alternative display position are moved respectively.

These implementations may enable the user to adjust the display position, so that the display position is more in line with wishes of the user.

In some alternative implementations of the present embodiment, the recognizing at least one alternative display position of the to-be-displayed content in the scene image in step 401, may include: recognizing a position of a preset graphics as the alternative display position of the to-be-displayed content in the scene image.

In these alternative implementations, the executing body may recognize the position of the preset shape in the scene image. The preset shape here may be various shapes, such as circle, rectangle, or trapezoid. The circle here may be a wall clock in the scene image, the rectangle may be a photo frame in the scene image, and the trapezoid may be a flower pot in the scene image. The alternative display position recognized by recognizing the preset shape in these implementations may be some of the alternative display position or all the alternative display position recognized, that is, part of the alternative display position or all the alternative display position in the at least one alternative display position.

These implementations may recognize the position of a specific shape as the position of the displayed content, which helps increase interest of the display to the live stream user.

In some alternative application scenarios of these implementations, step 404 may include: adjusting a size of the to-be-displayed content to a size of the target display position, in response to determining that the size of the to-be-displayed content does not match the size of the target display position; and adding an adjusted to-be-displayed content to the target display position in the background image to obtain the processed background image.

In these application scenarios, the executing body may adjust the size of the to-be-displayed content when the size of the to-be-displayed content does not match the size of the target display position, so that the adjusted size of the to-be-displayed content is equal to the size of the target display position.

In these application scenarios, the size of the to-be-displayed content may be adjusted to make the to-be-displayed content more closely match the target display position, which helps obtaining a better display effect.

In some alternative implementations of the present embodiment, the receiving a scene image in step 401, may include: receiving the scene image, in response to a status of a pre-recognition function being on, where a shooting time interval between the scene image and the target video stream is smaller than a specified interval threshold.

In these alternative implementations, the executing body may receive the scene image when the status of the pre-recognition function is on. The pre-recognition function refers to a function of pre-recognizing the target display position before an anchor begins live stream, that is, before acquiring the target video stream.

The executing body may have a status parameter indicating whether the pre-recognition function of the present electronic device is on or off, such as 1 or 0.

These implementations may control whether to perform the pre-recognition of the display position through the status of the pre-recognition function, and by limiting the shooting time interval, ensure the matching between the recognized display position with a corresponding position in the live stream room.

Figure 5:
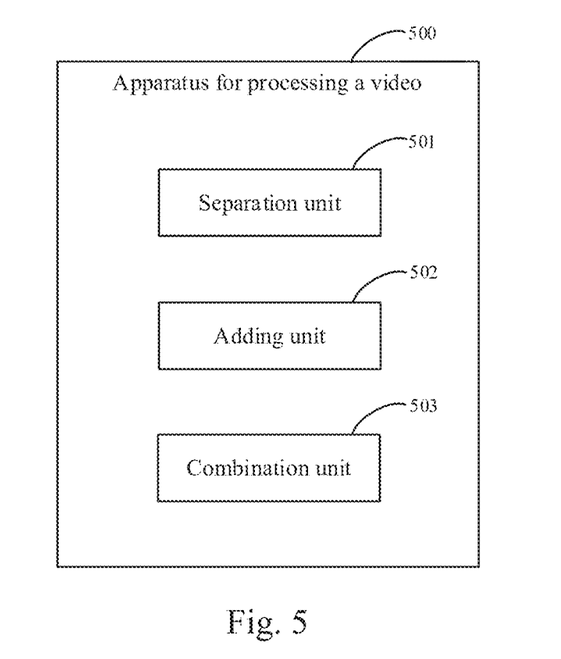
FIG. 5 is a structural schematic diagram of an embodiment of an apparatus for processing a video according to the present disclosure.

With further reference to FIG. 5, as an implementation of the method shown in the above figures, the present disclosure provides an embodiment of an apparatus for processing a video, and the apparatus embodiment corresponds to the method embodiment as shown in FIG. 2. In addition to the features described below, the apparatus embodiment may also include the same or corresponding features or effects as the method embodiment shown in FIG. 2. The apparatus may be specifically applied to various electronic devices.

As shown in FIG. 5, an apparatus 500 for processing a video of the present embodiment includes: a separation unit 501, an adding unit 502 and a combination unit 503. The separation unit 501 is configured to separate a foreground image and a background image from a video frame in the target video stream, in response to acquiring a target video stream. The adding unit 502 is configured to add a to-be-displayed content at a target display position in the background image to obtain a processed background image. The combination unit 503 is configured to combine the foreground image and the processed background image to obtain a target video frame.

In the present embodiment, for the specific processing and technical effects thereof of the separation unit 501, the adding unit 502 and the combination unit 503 in the apparatus 500 for processing a video, reference may be made to the relevant descriptions of step 201, step 202 and step 203 in the corresponding embodiment of FIG. 2 respectively, and detailed description thereof will be omitted.

In some alternative implementations of the present embodiment, the target video stream is a live video stream; the apparatus further includes: a recognition unit, configured to before the separating a foreground image and a background image from a video frame in the target video stream, in response to acquiring a target video stream, receive a scene image, and recognize at least one alternative display position of the to-be-displayed content in the scene image, where the scene image is a single image or a video stream, and a scene in the scene image and a scene in the target video stream are a same scene; and a determination unit, configured to determine the target display position based on the at least one alternative display position.

In some alternative implementations of the present embodiment, the determination unit is further configured to determine the target display position based on the at least one alternative display position as follows: acquiring adjustment information for the at least one alternative display position, where the adjustment information includes position selection information and/or position movement information; and adjusting the at least one alternative display position based on the adjustment information, and using an adjustment result as the target display position.

In some alternative implementations of the present embodiment, the determination unit is further configured to recognize at least one alternative display position of the to-be-displayed content in the scene image as follows: recognizing a position of a preset shape as the alternative display position of the to-be-displayed content in the scene image.

In some alternative implementations of the present embodiment, the adding unit is further configured to add a to-be-displayed content at a target display position in the background image to obtain a processed background image as follows: adjusting a size of the to-be-displayed content to a size of the target display position, in response to determining that the size of the to-be-displayed content does not match the size of the target display position; and adding an adjusted to-be-displayed content to the target display position in the background image to obtain the processed background image.

In some alternative implementations of the present embodiment, the recognition unit is further configured to receive a scene image as follows: receiving the scene image, in response to a status of a pre-recognition function being on, where a shooting time interval between the scene image and the target video stream is smaller than a specified interval threshold.

According to an embodiment of the present disclosure, the present disclosure also provides an electronic device and a readable storage medium.

Figure 6:
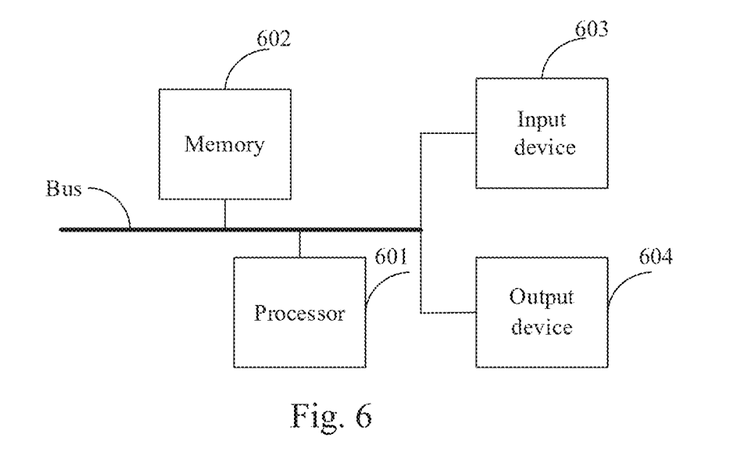
FIG. 6 is a block diagram of an electronic device for implementing the method for processing a video according to an embodiment of the present disclosure.

As shown in FIG. 6, is a block diagram of an electronic device of the method for processing a video according to an embodiment of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processors, cellular phones, smart phones, wearable devices, and other similar computing apparatuses. The components shown herein, their connections and relationships, and their functions are merely examples, and are not intended to limit the implementation of the present disclosure described and/or claimed herein.

As shown in FIG. 6, the electronic device includes: one or more processors 601, a memory 602, and interfaces for connecting various components, including high-speed interfaces and low-speed interfaces. The various components are connected to each other using different buses, and may be installed on a common motherboard or in other methods as needed. The processor may process instructions executed within the electronic device, including instructions stored in or on the memory to display graphic information of GUI on an external input/output apparatus (such as a display device coupled to the interface). In other embodiments, a plurality of processors and/or a plurality of buses may be used together with a plurality of memories and a plurality of memories if desired. Similarly, a plurality of electronic devices may be connected (for example, used as a server array, a set of blade servers, or a multi-processor system), and each device provide some necessary operations. In FIG. 6, processor 601 is used as an example.

The memory 602 is a non-transitory computer readable storage medium provided by the present disclosure. The memory stores instructions executable by at least one processor, so that the at least one processor performs the method for processing a video provided by the present disclosure. The non-transitory computer readable storage medium of the present disclosure stores computer instructions for causing a computer to perform the method for processing a video provided by the present disclosure.

The memory 602, as a non-transitory computer readable storage medium, may be used to store non-transitory software programs, non-transitory computer executable programs and modules, such as program instructions/modules corresponding to the method for processing a video in the embodiments of the present disclosure (for example, the separation unit 501, the adding unit 502 and the combination unit 503 as shown in FIG. 5). The processor 601 executes the non-transitory software programs, instructions, and modules stored in the memory 602 to execute various functional applications and data processing of the server, that is, to implement the method for processing a video in the foregoing method embodiments.

The memory 602 may include a storage program area and a storage data area, where the storage program area may store an operating system and an application program required by at least one function; and the storage data area may store data created by the electronic device for processing a video. In addition, the memory 602 may include a high-speed random access memory, and may further include a non-transitory memory, such as at least one magnetic disk storage device, a flash memory or other non-transitory solid state storage devices. In some embodiments, the memory 602 may alternatively include a memory disposed remotely relative to the processor 601, which may be connected through a network to the electronic device adapted to execute the method for processing a video. Examples of such networks include, but are not limited to, the Internet, enterprise intranets, local area networks, mobile communication networks and combinations thereof.

The electronic device adapted to execute the method for processing a video may further include an input device 603 and an output device 604. The processor 601, the memory 602, the input device 603 and the output device 604 may be interconnected through a bus or other means, and an example of a connection through a bus is shown in FIG. 6.

The input device 603 may receive input digit or character information, and generate key signal input related to user settings and functional control of the electronic device adapted to execute the method for processing a video, such as a touch screen, a keypad, a mouse, a track pad, a touch pad, a pointer bar, one or more mouse buttons, a trackball or a joystick. The output device 604 may include a display device, an auxiliary lighting device (such as an LED) and a tactile feedback device (such as a vibration motor). The display device may include, but is not limited to, a liquid crystal display (LCD), a light emitting diode (LED) display and a plasma display. In some embodiments, the display device may be a touch screen.

The various embodiments of the systems and technologies described herein may be implemented in digital electronic circuit systems, integrated circuit systems, ASICs (application specific integrated circuits), computer hardware, firmware, software and/or combinations thereof. The various embodiments may include: being implemented in one or more computer programs, where the one or more computer programs may be executed and/or interpreted on a programmable system including at least one programmable processor, and the programmable processor may be a dedicated or general-purpose programmable processor, which may receive data and instructions from a memory system, at least one input device and at least one output device, and send the data and instructions to the memory system, the at least one input device and the at least one output device.

These computing programs (also known as programs, software, software applications or code) include machine instructions of a programmable processor and may be implemented in high-level procedures and/or object-oriented programming languages, and/or assembly or machine languages. As used herein, the terms "machine readable medium" and "computer readable medium" refer to any computer program product, device and/or apparatus (such as magnetic disk, optical disk, memory and programmable logic device (PLD)) for providing machine instructions and/or data to a programmable processor, including a machine readable medium that receives machine instructions as machine readable signals. The term "machine readable signal" refers to any signal used to provide machine instructions and/or data to a programmable processor.

To provide interaction with a user, the systems and technologies described herein may be implemented on a computer having: a display device (such as a CRT (cathode ray tube) or LCD (liquid crystal display) monitor) for displaying information to the user; and a keyboard and a pointing device (such as a mouse or a trackball) through which the user may provide input to the computer. Other types of devices may also be used to provide interaction with the user. For example, the feedback provided to the user may be any form of sensory feedback (such as visual feedback, auditory feedback or tactile feedback); and input from the user may be received in any form, including acoustic input, speech input or tactile input.

The systems and technologies described herein may be implemented in: a computing system including a background component (such as a data server), or a computing system including a middleware component (such as an application server), or a computing system including a front-end component (such as a user computer having a graphical user interface or a web browser through which the user may interact with the implementation of the systems and technologies described herein), or a computing system including any combination of such background component, middleware component or front-end component. The components of the system may be interconnected by any form or medium of digital data communication (such as a communication network). Examples of communication networks include a local area network (LAN), a wide area network (WAN), and the Internet.

The computer system may include a client and a server. The client and the server are typically remote from each other and typically interact through a communication network. The relationship between the client and the server is generated by a computer program running on the corresponding computer and having a client-server relationship with each other.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, may be described as: a processor, including a separation unit, an adding unit and a combination unit. Here, the names of these units do not in some cases constitute limitations to such units themselves. For example, the separation unit may also be described as "a unit configured to separate a foreground image and a background image from a video frame in the target video stream, in response to acquiring a target video stream."

In another aspect, the present disclosure further provides a computer readable medium. The computer readable medium may be included in the apparatus in the above described embodiment, or a stand-alone computer readable medium not assembled into the apparatus. The computer readable medium stores one or more programs. The one or more programs, when executed by the apparatus, cause the apparatus to: separate a foreground image and a background image from a video frame in the target video stream, in response to acquiring a target video stream; add a to-be-displayed content at a target display position in the background image to obtain a processed background image; and combine the foreground image and the processed background image to obtain a target video frame.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for processing a video, the method comprising:
receiving a scene image, and recognizing at least one alternative display position in the scene image, wherein the scene image is a single image or a video stream;
determining a target display position in the scene image based on the at least one alternative display position, wherein the target display position is for displaying a to-be-displayed content;
wherein after determining the target display position in the scene image, the method further comprises,
acquiring a target video stream;
determining that a scene in the target video stream and a scene in the scene image are a same scene, and separating a foreground image and a background image from a video frame in the target video stream;
adding the to-be-displayed content at a position in the background image corresponding to the target display position in the scene image, to obtain a processed background image; and combining the foreground image and the processed background image to obtain a target video frame.

2. The method according to claim 1, wherein the determining that a scene in the target video stream and a scene in the scene image are a same scene comprises:
in response to determining that there are at least some same objects between the scene image and the target video stream, determining that the scene in the scene image and the scene in the target video stream are the same scene.

3. The method according to claim 1, wherein the determining the target display position in the scene image based on the at least one alternative display position, comprises:
acquiring adjustment information for the at least one alternative display position, wherein the adjustment information comprises position selection information and/or position movement information; and
adjusting the at least one alternative display position based on the adjustment information, and using an adjustment result as the target display position.

4. The method according to claim 1, wherein the recognizing at least one alternative display position in the scene image, comprises:
recognizing a position of a preset shape as an alternative display position of the to-be-displayed content in the scene image.

5. The method according to claim 4, wherein the adding the to-be-displayed content at a position in the background image corresponding to the target display position in the scene image, to obtain a processed background image, comprises:
adjusting a size of the to-be-displayed content to a size of the target display position, in response to determining that the size of the to-be-displayed content does not match the size of the target display position; and
adding an adjusted to-be-displayed content to the target display position in the background image to obtain the processed background image.

6. The method according to claim 1, wherein the receiving a scene image, comprises:
receiving the scene image and recognizing the target display position in the scene image before acquiring the target video stream, in response to determining that a pre-recognition function is in an on status, wherein a shooting time interval between the scene image and the target video stream is smaller than a specified interval threshold.

7. The method according to claim 1, wherein the scene image and the target video stream are shoot at different times.

8. The method according to claim 7, wherein the scene image and the target video stream are shoot by a same device at different times, an image of a person is in the foreground image, and the image of the person is not in the scene image and the background image.

9. An electronic device, comprising:
one or more processors; and
a storage device, for storing one or more programs,
wherein the one or more programs, when executed by the one or more processors, cause the one or more processors to perform operations comprising:
receiving a scene image, and recognizing at least one alternative display position in the scene image, wherein the scene image is a single image or a video stream;
determining a target display position in the scene image based on the at least one alternative display position, wherein the target display position is for displaying a to-be-displayed content;
wherein alter determining the target display position in the scene image, the method further comprises,
acquiring a target video stream;
determining that a scene in the target video stream and a scene in the scene image are a same scene, and separating a foreground image and a background image from a video frame in the target video stream;
adding the to-be-displayed content at a position in the background image corresponding to the target display position in the scene image, to obtain a processed background image; and
combining the foreground image and the processed background image to obtain a target video frame.

10. The electronic device according to claim 9, wherein the determining that a scene in the target video stream and a scene in the scene image are a same scene comprises:
in response to determining that there are at least some same objects between the scene image and the target video streams determining that the scene in the scene image and the scene in the target video stream are the same scene.

11. The electronic device according to claim 9, wherein the determining the target display position in the scene image based on the at least one alternative display position, comprises:
acquiring adjustment information for the at least one alternative display position, wherein the adjustment information comprises position selection information and/or position movement information; and
adjusting the at least one alternative display position based on the adjustment information, and using an adjustment result as the target display position.

12. The electronic device according to claim 9, wherein the recognizing at least one alternative display position in the scene image, comprises:
recognizing a position of a preset shape as an alternative display position of the to-be-displayed content in the scene image.

13. The electronic device according to claim 12, wherein the adding the to-be-displayed content at a position in the background image corresponding to the target display position in the scene image, to obtain a processed background image, comprises:
adjusting a size of the to-be-displayed content to a size of the target display position, in response to determining that the size of the to-be-displayed content does not match the size of the target display position; and
adding an adjusted to-be-displayed content to the target display position in the background image to obtain the processed background image.

14. The electronic device according to claim 9, wherein the receiving a scene image, comprises:
receiving the scene image and recognizing the target display position in the scene image before acquiring the target video stream, in response to determining that a pre-recognition function is in an on status, wherein a shooting time interval between the scene image and the target video stream is smaller than a specified interval threshold.

15. A non-transitory computer readable storage medium, storing a computer program thereon, the program, when executed by a processor, causes the processor to perform operations comprising:

receiving a scene image, and recognizing at least one alternative display position in the scene image, wherein the scene image is a single image or a video stream;

determining a target display position in the scene image based on the at least one alternative display position, wherein the target display position is for displaying a to-be-displayed content;

wherein after determining the target display position in the scene image, the method further comprises, acquiring a target video stream;

determining that a scene in the target video stream and a scene in the scene image are a same scene, and separating a foreground image and a background image from a video frame in the target video stream;

adding the to-be-displayed content at a position in the background image corresponding to the target display position in the scene image, to obtain a processed background image; and combining the foreground image and the processed background image to obtain a target video frame.

16. The storage medium according to claim 15, wherein the determining that a scene in the target video stream and a scene in the scene image are a same scene comprises:

in response to determining that there are at least some same objects between the scene image and the target video stream, determining that the scene in the scene image and the scene in the target video stream are the same scene.

17. The storage medium according to claim 15, wherein the determining the target display position in the scene image based on the at least one alternative display position, comprises:

acquiring adjustment information for the at least one alternative display position, wherein the adjustment information comprises position selection information and/or position movement information; and adjusting the at least one alternative display position based on the adjustment information, and using an adjustment result as the target display position.

18. The storage medium according to claim 15, wherein the recognizing at least one alternative display position in the scene image, comprises:

recognizing a position of a preset shape as an alternative display position of the to-be-displayed content in the scene image.

19. The storage medium according to claim 18, wherein the adding the to-be-displayed content at a position in the background image corresponding to the target display position in the scene image, to obtain a processed background image, comprises:

adjusting a size of the to-be-displayed content to a size of the target display position, in response to determining that the size of the to-be-displayed content does not match the size of the target display position; and adding an adjusted to-be-displayed content to the target display position in the background image to obtain the processed background image.

20. The storage medium according to claim 15, wherein the receiving a scene image, comprises:

receiving the scene image and recognizing the target display position in the scene image before acquiring the target video stream, in response to determining that a pre-recognition function is in an on status, wherein a shooting time interval between the scene image and the target video stream is smaller than a specified interval threshold.

* * * * *

UNITED STATES PATENT AND TRADEMARK OFFICE
CERTIFICATE OF CORRECTION

PATENT NO. : 11,700,417 B2
APPLICATION NO. : 17/204237
DATED : July 11, 2023
INVENTOR(S) : Zhaomin Zhu Page 1 of 1

It is certified that error appears in the above-identified patent and that said Letters Patent is hereby corrected as shown below:

In the Claims

Column 14, Line 5, Claim 9, delete "alter" and insert -- after --

Column 14, Line 23, Claim 10, delete "streams" and insert -- stream, --

Signed and Sealed this
Twenty-ninth Day of August, 2023

Katherine Kelly Vidal
*Director of the United States Patent and Trademark Office*